UNITED STATES PATENT OFFICE 2,540,815

ART OF PACKAGING CHEESE

Elmer E. Eldredge, Plymouth, Wis., assignor, by mesne assignments, to The Borden Company, New York, N. Y., a corporation of New Jersey No Drawing. Application June 17, 1948, Serial No. 33,659

2 Claims. (Cl. 99—178)

This invention relates to cheese manufacture and particularly to the packaging of the cheese in its natural state.

The principal purposes of the invention are to prevent molding, prevent the formation of rind on the cheese and to minimize the loss of moisture from the cheese. The invention accomplishes these purposes through a packaging method which is simple and economical and fits readily into the regular production procedure.

In its essentials, the method comprises the wrapping of the natural cheese into a dry, moisture proof sheet material and shrinking the wrapper on the cheese, and then storing the packaged cheese in a suitable container. This method obviates the need for applying external pressure on the package in order to hold the wrapper contiguous to the cheese, and while provision is made for the escape of internally formed gases, air is effectively excluded from contacting the surface of the cheese and the accumulation of mold as well as the formation of a rind are prevented.

Sheet materials for such wrapping which are substantially impervious to moisture and to gases, and which are tensilized or oriented, that is, will shrink when subjected to heat, are known commercial products. Such a sheet material is made of chlorinated rubber and is known in the trade as "Pliofilm." The grain structure of this particular material is more generally such that it is especially tensilized more in one direction than in the other and consequently when heated will shrink more in the one direction, although "Pliofilm" is known which will shrink equally in all directions. Other suitable sheet material for the purpose, being moisture proof and shrinkable when heated, are commercial, for example, a film material made by Dow Chemical Company and sold under the trade name of "Saran" and one made by The Dewey and Almy Company and sold under the trade name of "Cry-O-Vac." These latter two have the property of shrinking substantially equally in all directions when heated.

In carrying out the method, an individual quantity of the natural cheese is wrapped tightly in a proper size sheet of such moisture proof and tensilized material, and the ends of the wrapper are closed and folded against opposite sides of the contained cheese. Conveniently these end folds, preliminary to the subsequent shrinking operation, are secured down by an adhesive strip or patch. Otherwise the ends of the wrapper are left unsealed. The wrapper is then subjected to heat on all sides of the package so as to cause it to shrink and snug the contents tightly. The wrapped package is then deposited in a suitable pervious or unsealed container, such as a corrugated paper box. The container may be an individual box or several packages may be disposed in the same box. If the supplemental adhesive member is not applied to the end folds to hold them in to the respective sides of the package, it is desirable that the individual storage boxes be made a sufficiently close fit to hold the ends closed, and that in the mass packing, the adjacent packages be disposed with their end folds in contact so as to be mutually effective in keeping each other's end folds closed.

The heat to shrink the wrapper may be applied in any suitable manner, as by a hot plate, steam or hot air. The coefficient of shrinkage of the material is such that the desired shrinkage can be effected without materially melting the cheese at the surface.

While under ideal conditions a single wrapping in the sheet material described and contemplated will suffice when shrunken on to hold the moisture in the cheese and to exclude air and hence prevent molding and formation of rind, it has been found in practice desirable to employ a double wrapping and to fold the two wrappers in directions respectively at right angle to each other so that the end folds of the two wrappers are at different sides. Pin holes and other possible defects in the sheet material are thus covered and effective exclusion of air is the better assured. Furthermore, the non-coincidence of the folded ends enhances the improbability that air will deleteriously get in to the cheese through those ends, while means are nevertheless provided for the escape of gases formed internally of the package.

With sheet material that shrinks equally in all directions, the arrangement of the wrapper on the package with relation to the grain structure of the wrapper is immaterial. However, with the "Pliofilm," for example, which shrinks under heat mostly in one direction, it is desirable to arrange the two wrappers with their grain structures crossed, and thus distribute the shrinkage equally about the package. Preferably though not necessarily, such wrapping material will be disposed and wrapped so that the maximum shrinkage will be in the direction of wrapping.

Cheese so wrapped is found to have substantially its original moisture content, and surface molding is virtually non-existent. Surface drying and the formation of rind is also minimized.

While specific examples of wrapping material have been mentioned, it will be understood that the invention as defined in the following claims contemplates the use of any wrapping material having the properties described.

I claim:

1. The method of packaging cheese consisting in tightly wrapping a quantity of green cheese in one direction in a dry sheet wrapper which is impervious to moisture and gases and which will shrink materially when subjected to heat with the wrapper unsealed and with the ends of the wrapper folded up against their sides of the contents, and then tightly wrapping that package in another similar wrapper in a direction transverse that of the original wrapping with the second wrapper unsealed and with its ends folded up against the sides of the enclosed package intermediate the ends of the inner wrapper, and then applying heat to the wrappers until they are tightly shrunk on to the cheese while leaving the wrappers ununited and unsealed.

2. The method of packaging cheese consisting in disposing a quantity of green cheese in a dry sheet wrapper which is impervious to moisture and gases and will shrink principally in one direction when subjected to heat and wrapping the sheet tightly about the cheese in the said one direction with the wrapper unsealed and with the ends folded up against their sides of the contents, and disposing the said package in a second similar sheet with its said one direction transverse that of the inner sheet and wrapping the second sheet in its said one direction tightly about the said package with the outer wrapper unsealed and with its ends folded up against the sides of the contents intermediate the folded ends of the inner wrapper, and then applying heat to the wrappers until they are tightly shrunk on to the cheese while leaving the wrappers ununited and unsealed.

ELMER E. ELDREDGE.

REFERENCES CITED

The following references are of record in the file of this patent:

UNITED STATES PATENTS

| Number | Name | Date |
|---|---|---|
| 2,168,651 | McCoy | Aug. 8, 1939 |
| 2,176,153 | Semon | Oct. 17, 1939 |
| 2,256,159 | Young | Sept. 16, 1941 |
| 2,259,347 | Mallory | Oct. 14, 1941 |
| 2,420,310 | Goodman | May 13, 1947 |

OTHER REFERENCES

Food Industries, Dec. 1941, page 89.